April 14, 1970     W. G. BENJEY     3,506,025

PROPORTIONAL BLENDING APPARATUS

Filed March 30, 1965     5 Sheets-Sheet 3

Inventor
William G. Benjey,
By Misegades & Douglas
Keith Misegades
Attorneys

United States Patent Office 3,506,025
Patented Apr. 14, 1970

3,506,025
PROPORTIONAL BLENDING APPARATUS
William G. Benjey, Alpena, Mich., assignor to Elastizell Corporation of America, Alpena, Mich., a corporation of Delaware
Filed Mar. 30, 1965, Ser. No. 443,862
Int. Cl. B01f 3/08, 5/04
U.S. Cl. 137—99                                                    15 Claims

ABSTRACT OF THE DISCLOSURE

The invention comprises a blending apparatus for blending oil with motive fluid or water for the apparatus and includes two inlet lines, one for water and one for oil, a primary piston and rod driven by water through an alternating four-way valve, and a secondary, slave piston which feeds soluble oil into an exhaust chamber where it is mixed with water. The amount of oil fed into the chamber is controlled through a manually regulated compensating chamber operatively connected to the slave cylinder for the slave piston. A safety trip mechanism is provided having a vacuum line communicating with the oil inlet line, whereupon depletion of oil therein, the safety trip is activated to interrupt flow of water to the apparatus.

---

This invention relates to liquid dispensing mechanisms, and in particular, to a device for blending and dispensing at least two liquids, and controlling the proportions of each by volume ratio.

The invention has particular application to the coolant problem encountered in the machine tool industry. This industry requires a copious supply of liquid coolant directed to the working members of the machine tool to prevent overheating thereof. Usually, the coolant includes water and a soluble, or synthetic soluble oil; the water draws off heat while the soluble oil comingled therewith reduces friction and the heat produced thereby in the operative area of a milling, drilling, or grinding machine tool. Conditions require that the coolant composition be as carefully controlled as possible in order to prevent damage to the machine tool. In addition, it is necessary to be able to quickly and conveniently alter the proportions of water to oil dependent upon the machine tool being used, and upon the specific material being worked on by the machine. It is further necessary that the constituent parts of the coolant be thoroughly mixed together.

The invention solves the above problems by providing a blending apparatus which dispenses an uninterrupted flow of carefully proportioned fluid. An adjustment mechanism is provided in the path of travel of one of the liquids, for regulating the amount thereof to be blended. The other liquid is introduced to the invention under pressure and provides the motive force necessary to mix the first fluid therewith. A safety valve device is provided to automatically interrupt the operation of the invention when the supply of the first liquid is exhausted. Finally, the invention includes an exhaust mechanism which effectively and completely blends the two liquids.

The preferred embodiment of the invention includes a pumping apparatus having two inlet lines, one for receiving the soluble oil under force of gravity, the other for receiving the motive liquid, or water, under pressure. The water is introduced through a four-way valve to a cylinder having a piston and rod. A second cylinder is provided, having a second piston therein, and is slave driven by the rod which is common to both cylinders. The soluble oil is introduced to the second cylinder through a safety valve, which has a vacuum line therein secured to a trip mechanism in the water inlet line. If the supply of oil becomes depleted, the trip mechanism will be activated, thus stopping the flow of water to the invention. A compensating cylinder is provided adjacent the second cylinder, and has a free piston therein, limited in travel by an externally operable stop device. As the first piston is moved by the introduction of water under pressure, a corresponding movement of the second piston is induced by the common rod. This in turn injects soluble oil into the compensating cylinder, thereby propelling the free piston. When the free piston reaches its stop, a small amount of the soluble oil is expelled through an exhaust valve, by the residual effect of the primary piston, into the exhaust mechanism, which is secured to and fed by the four-way valve. There, the soluble oil is blended with the water, and the resultant coolant is then piped to one or a series of machine tools. A reversing mechanism for operating the four-way valve is secured to the common piston rod, externally of the second cylinder, for reversing the flow of water to the first cylinder, thus imparting reciprocating motion to the first piston and an interrupted flow of coolant.

Obviously, the invention is adaptable to other arts where it is desirable to provide an accurate blend of at least two liquids of unlike physical characteristics.

Further understanding of the present invention may be had by reference to the following specification and drawings, in which.

Figure 1:
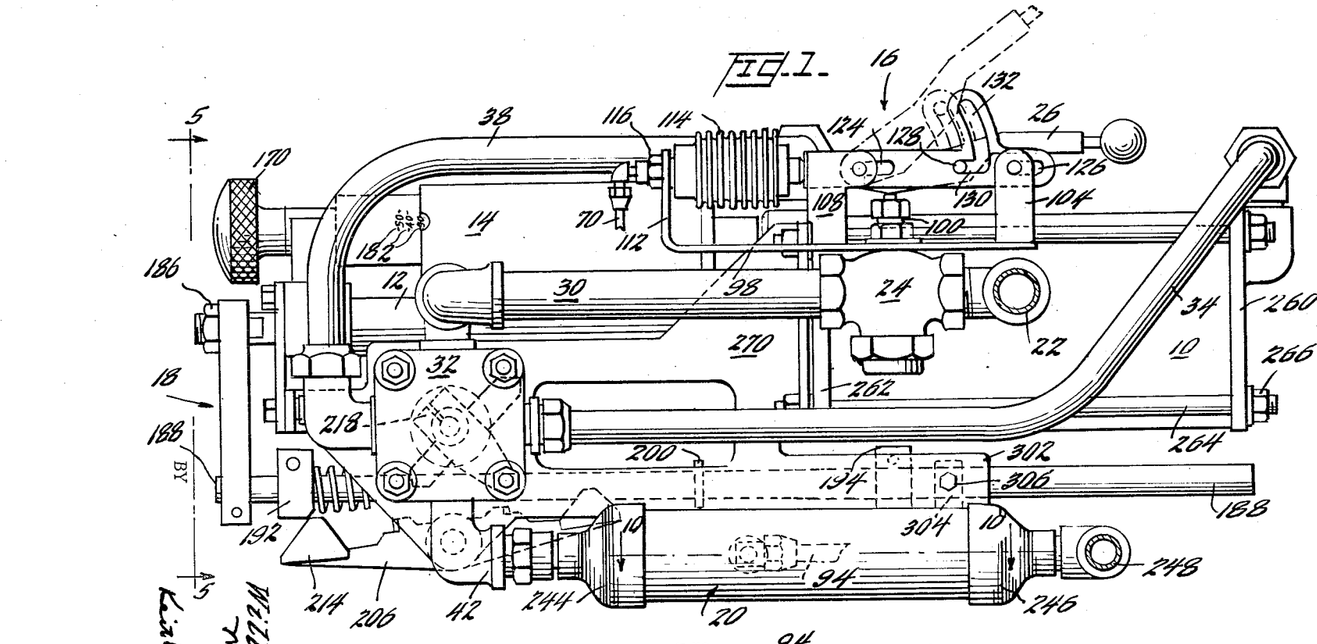
FIG. 1 is a front side elevational view of the invention.

Referring now to the drawings by reference character, and, in particular, to FIG. 1 thereof, the invention is shown comprising primary, or water cylinder 10, slave cylinder 12, compensating cylinder 14, safety shut-off assembly 16, reversing assembly 18, and exhaust chamber 20. The paths of travel of the two liquids are maintained separately until they are mixed together in exhaust chamber 20. Motive force for the invention is supplied by the liquid under pressure, in this case water, which in this preferred embodiment, enters the device under a pressure of between 30 and 100 lbs. per square inch. The second liquid or soluble oil, which hereinafter will be referred to as concentrate, enters the invention under force of gravity and is driven through the system by the motive force supplied by the water entering the device under pressure.

Figures 8, 11:
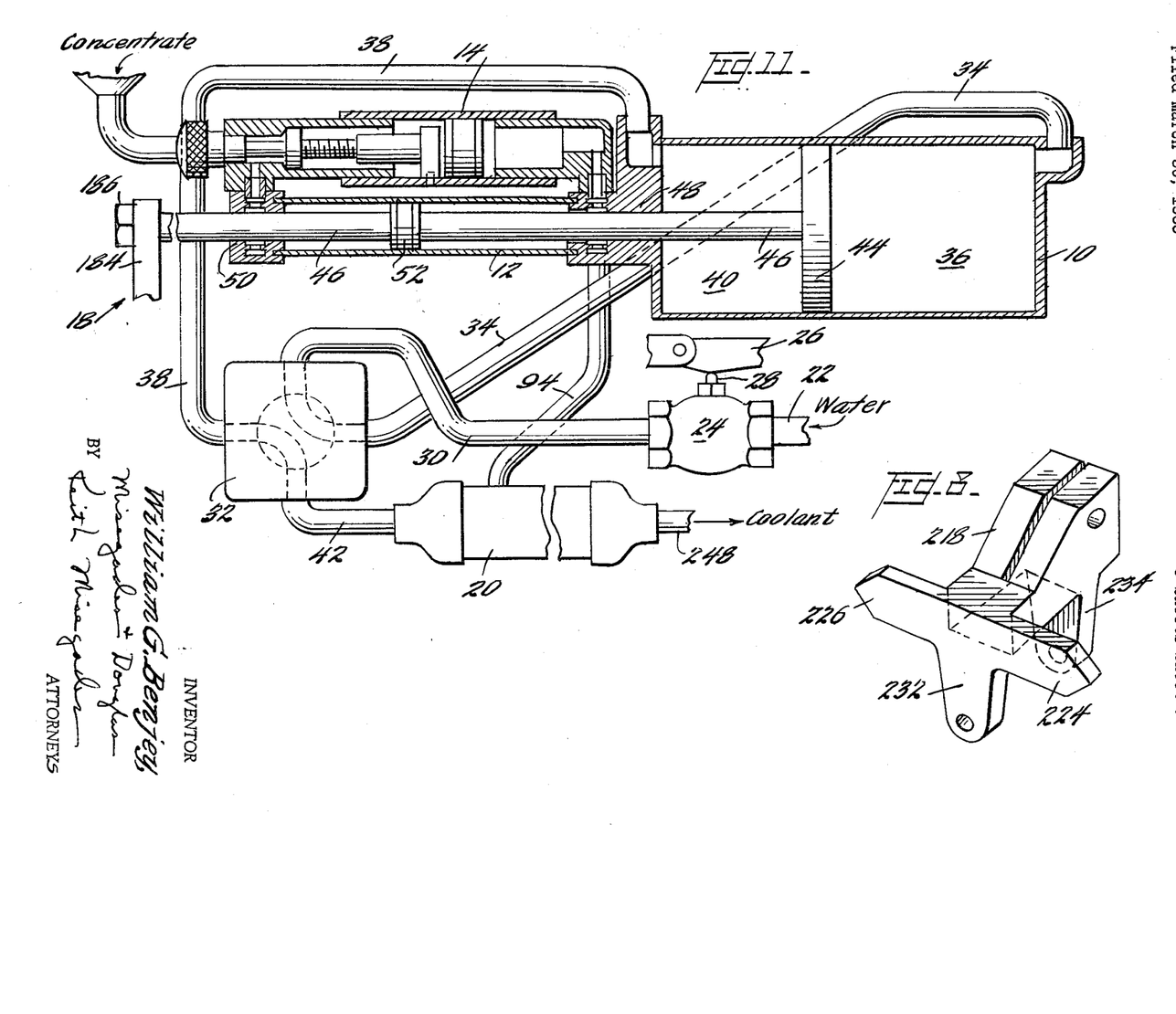
FIG. 8 is an isometric view of the reversing element used to activate the four-way valve, as illustrated in FIGS. 6 and 7.
FIG. 11 is a partial diagrammatic view of the invention, showing the operation thereof.
Figure 9:
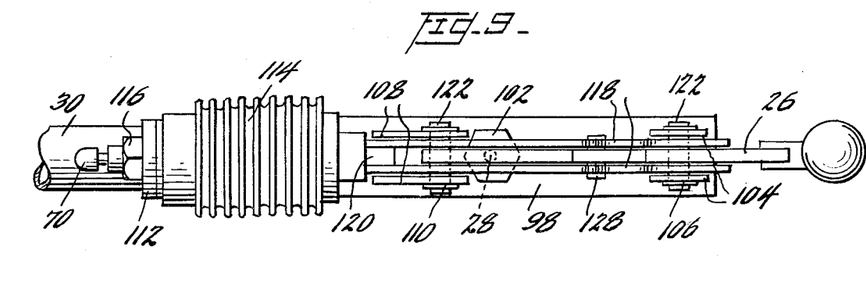
FIG. 9 is a top plan view of the safety trip mechanism used to shut off the supply of liquid under pressure.

Referring now to FIGS. 1 and 11, the path of travel of liquid under pressure through the invention will be discussed. Water under pressure enters the system through a convenient connector element 22. The water then passes through an ordinary, quick opening valve 24 to which safety shut-off assembly 16 is secured. As shown in FIG. 11, valve 24 is opened by depression of handle 26 of shut-off assembly 16 against plunger 28 of valve 24. Pipe 30 connects valve 24 to a standard four-way valve 32. As shown in FIG. 11, the four-way valve 32 then directs water through pipe 34 to the rear of water cylinder 10, where the water enters and fills cavity 36 of cylinder 10. When the four-way valve 32 is reversed, water will be transmitted from pipe 30 to pipe 38 and hence to the opposite side of water cylinder 10 to cavity 40 therein. An exhaust line 42 is secured to the remaining port of four-way valve 32 and to exhaust chamber 20. It is apparent that water entering through pipe 34 will enter and fill cavity 36, thereby exerting a force on piston 44 located in water cylinder 10. At the same time, residual water in cavity 40 will be forced through pipe 38 to the four-way valve 32, and thence to the exhaust line 42 and exhaust chamber 20. In like manner, reversal of four-way valve 32 will cause water to pass through pipe 38 to cavity 40, thereby exerting a force on piston 44, and expelling water through pipe 34 and four-way valve 32 to exhaust line 42 and exhaust chamber 20. Thus a constant reversal of four-way valve 32 will impart a reciprocating motion to piston 44 within water cylinder 10. Piston 44 is provided with a piston rod 46 which extends through liquid tight housing 48 to the interior of slave cylinder 12, and through a second fluid tight housing 50 to reversing assembly 18. A second piston 52 is located interiorly of slave cylinder 12, and is movable therein by the reciprocating action of piston 44.

Figure 4:
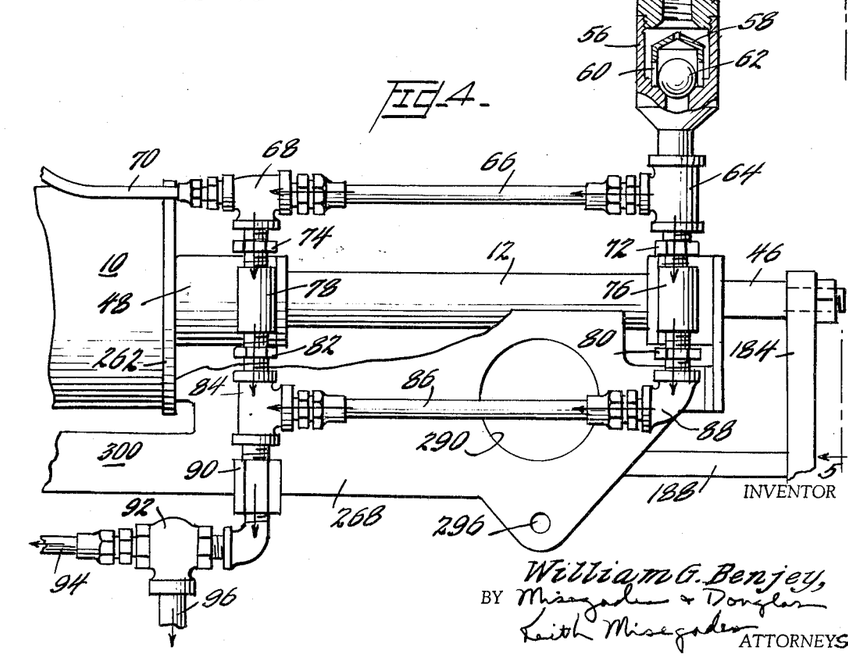
FIG. 4 is a rear side, partial elevational view of the invention, showing the path of travel of the liquid admitted by force of gravity.
Figure 5:
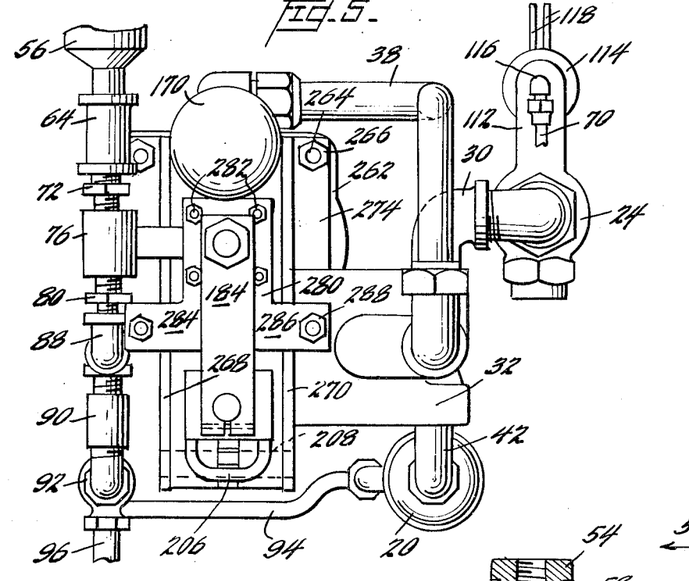
FIG. 5 is an end view of the invention as viewed from the left of FIG. 1, taken along lines 5—5 thereof.

Turning now to FIGS. 4 and 5, the path of travel of the second liquid, or concentrate, through the device, will now be explained. A reservoir of concentrate (not shown) is located so as to provide, by force of gravity, a supply of concentrate to a concentrate inlet connection 54. Immediately therebeneath is located a control valve which operates safety shut-off assembly 16. The control valve includes an outer casing 56, an interior cage 58 having ports 60 therein, and a hollow ball 62. As concentrate flows through the control valve, ball 62, having a specific gravity less than that of the concentrate, will float upwardly within cage 58, thereby permitting concentrate to pass through ports 60. When the oil supply is depleted, ball 62 will fall and seat itself in casing 56 and cage 58, thereby creating a vacuum within the concentrate line as will be explained later. Casing 56 is located upon T-fitting 64. One branch of T-fitting 64 includes a line 66 and a second T-fitting 68. One branch of T-fitting 68 is secured to vacuum line 70 which is secured at its other end to safety shut-off assembly 16 as will be explained below. The remaining open branches of T-fittings 64 and 68 are connected to check valves 72 and 74, respectively. A pair of slave cylinder inlet manifolds 76 and 78, together with a corresponding pair of additional check valves 80 and 82, are connected beneath check valves 72 and 74, respectively. A T-fitting 84 is connected to check valve, and has one branch secured to a second line 86 which is connected by an L-fitting 88 beneath check valve 80. A pressure relief valve 90 is connected to the remaining branch of T-fitting 84. Another T-fitting 92 is connected to valve 90, and has branches leading to the exhaust chamber 20 and to a testing bleed vial lines 94 and 96, respectively. Thus, the second liquid, or concentrate will enter the system through the control valve to T-fitting 64, thence via line 66 and T-fitting 68 to manifold 78, or directly to manifold 76. The pair of manifolds also serve as exhausts for the concentrate, as will become apparent below, and the concentrate continues through the remaining fittings and the pressure relief valve 90 to line 94 and finally to exhaust chamber 20. The direction of flow permitted by the several check valves is indicated by arrows in FIG. 4. At the same time, concentrate is forced through vacuum line 70 to the safety shut-off assembly 16. The structure and operation of assembly 16 will now be explained.

Safety shut-off assembly 16 is best shown by FIGS. 1, 4, 5, and 9. A bracket 98 is secured to the bonnet of the quick-open valve 24 at plunger housing 100 by a nut 102. Bracket 98 includes a pair of upstanding ears 104 having aligned bores 106 therein, an intermediate pair of inverse L-shaped ears 108 having aligned bores 110 therein, and an upturned arm 112 formed at the end thereof, opposite pair of ears 104. Vacuum line 70 is operatively attached to contractible bellows 114 by a suitable fitting 116 mounted through the upper end of arm 112. A movable release arm 118 is secured, at one end, to bellows 114 by nipple 120, and is mounted for sliding horizontal motion, between pairs of ears 104 and 108 by pins 122, secured in bores 106 and 110 through aligned slots 124 and 126, respectively, in release arm 118. Handle 26 is pivotally mounted, centrally of release arm 118, to pin 122 secured in bores 106. Handle 26 also includes a pair of laterally extending stub pins 128, adapted to be received in L-shaped slots 130 of release arm 118.

Safety shut-off assembly 16 operates as follows: When the concentrate supply has depleted, ball 62 of the valve shown in FIG. 4 will fall to the bottom of casing 56, thereby causing the valve to be sealed. At the same time, the continued pumping action of slave piston 52 will create a vacuum pressure within the concentrate piping system below casing 56. This vacuum pressure operates through line 70, causing bellows 114 to contract. Referring now to FIG. 1, this contraction causes release arm 118, attached to nipple 120, to move to the left, thereby allowing stub pins 128 of handle 26 to enter upper portions 132 of L-shaped slots 130. Handle 26 is then free to be deflected upwardly by plunger 28 of quick-open valve 24. When the handle 26 is moved to the position indicated by dot dash lines in FIG. 1, the quick-open valve 24 will be turned off, so as to prevent water from entering the apparatus of the invention. When a fresh supply of concentrate is provided, it is only necessary to deflect handle 26 downwardly until bellows 114 is expanded again by the fresh supply of concentrate. Thus the apparatus of the invention is precluded from discharging anything but a proper mixture of the two liquids provided, as a depletion in the supply of gravity fed liquid will cause the supply of motive liquid to be stopped, and consequently, a lack of motive liquid will prevent the invention from functioning at all.

Figure 2:
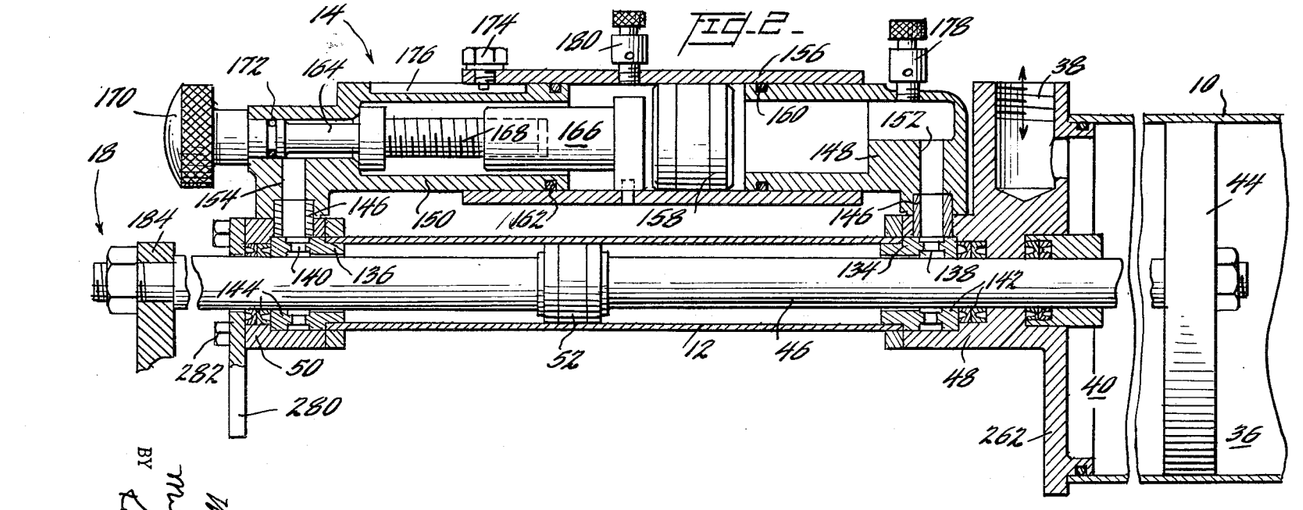
FIG. 2 is a sectional view of the slave and compensating cylinder portions of the invention.
Figure 3:
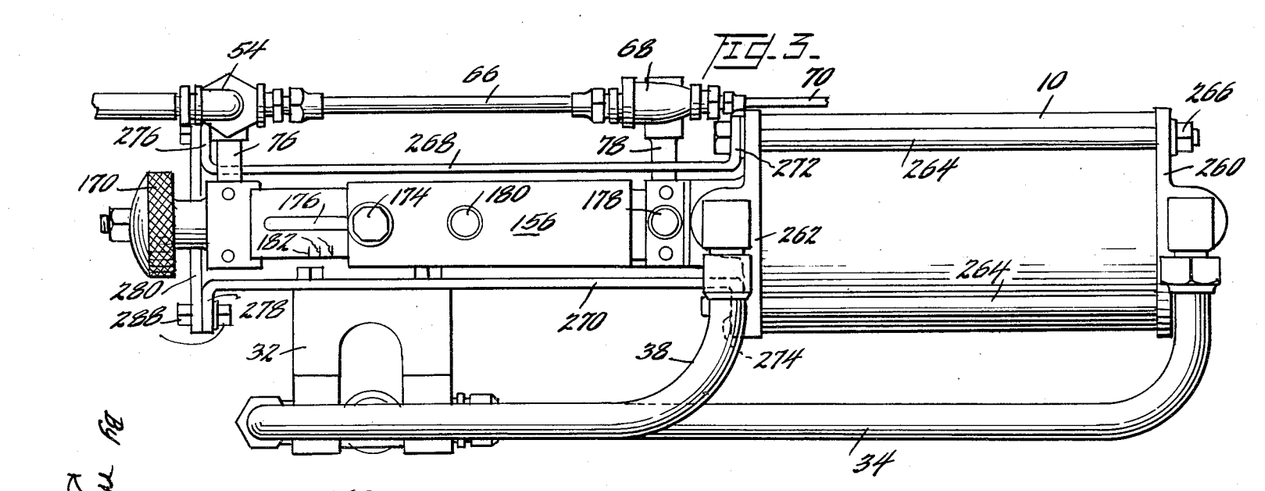
FIG. 3 is a stop plan view of the invention.

Attention is now directed to FIGS. 2 and 3 for a description of the means employed to meter a carefully controlled supply of concentrate, or gravity-fed liquid, for injection into exhaust chamber 20. As previously mentioned, the gravity-fed liquid, or concentrate, enters slave cylinder 12 through manifolds 76 and 78. At the ends of slave cylinder 12 are located clearance rings 134, 136, which are spaced a small distance from piston rod 46, so as to allow concentrate to pass therebetween. Small cavities 138, 140, are maintained immediately behind clearance rings 134 and 136, respectively. Adjacent these cavities are bushing and packing assemblies 142 and 144, mounted within housings 48 and 50 respectively, said assemblies assuring a fluid tight seal with respect to piston rod 46. Connectors 146, one mounted in each housing 48, 50, permits passage of concentrate from the slave cylinder to compensating cylinder assembly 14.

The compensating cylinder assembly 14 includes a pair of cylinder heads 148, 150, secured to housings 48 and 50 respectively, and having bores 152 and 154 therein for communication with each connector 146. A sliding tube assembly 156, having a free, floating piston 158 therein, is mounted for movement between cylinder heads 148 and 150 on the inwardly facing, free ends thereof. A pair of gaskets 160, 162, assure a fluid-tight seal of tube 156 with respect to heads 148 and 150. The travel of piston 158 is limited by cylinder head 148 and by an externally operable adjustment mechanism 164. This mechanism includes stop member 166, fixed within tube 156, and a screw 168, threadably entering into stop 166, and mounted through cylinder head 150 to a hand knob 170. A gasket 172 provides a fluid seal at the end of cylinder head 150, adjacent set screw 168. Adjustment mechanism 164 is spaced a sufficient distance from the interior of cylinder head 150 so as to permit the free passage of concentrate thereabout. In addition, tube 156 is provided with a dog point screw 174 which extends into slot 176 formed in the exterior of cylinder head 150. The combination of screw 174 and slot 176 prevents tube 156 from rotating with respect to cylinder head 150 when hand knob 170 is turned to operate adjustment mechanism 164. Finally, the compensating cylinder assembly 14 may be provided with a pair of hand operable relief vents 178, 180, one on each side of the allowable limits of the travel of free, floating piston 158.

For purposes of illustration, it is assumed that the four-way valve 32 is set so as to inject water through line 38 into cavity 40 of water cylinder 10. Referring now to FIG. 2, it is apparent that this will cause piston 44 to move in a right hand direction within water cylinder 10. At the same time, slave piston 52 will also move towards the right. Thus, concentrate within the metering assembly will be forced between 134 and piston rod 46, through cavity 138 and connector 146 to interior bore 152 of cylinder head 148. Free, floating piston 158 therefore moves towards the left, in response to the action of concentrate within bore 152. When piston 158 reaches the limits of its travel, as determined by stop 166, a small amount of concentrate will escape through pressure relief valve 90 (FIG. 4) into line 94 and exhaust chamber 20. The quantity of escaping concentrate is determined as follows: Piston 44, moving from left to right, is known to displace a certain volume of residual water within cavity 36 of water cylinder 10. At the instant piston head 44 begins to move towards the right, a certain known volume of concentrate is contained within slave cylinder 12, to the right of slave piston 52. The ratio of the amount of water contained in cavity 36 to the amount of concentrate contained within slave cylinder 12, to the right of piston 52, may be determined by the dimensions of these assemblies. As piston 44 moves to the right, floating piston 158 will move a distance, predetermined by stop 166, to absorb a portion of the fluid within slave cylinder 12. Once free piston 158 is stopped, the residual volume of concentrate within slave cylinder 12 will be expelled through the pressure relief valve 90. Variation in the quantity of concentrate thus expelled may be determined by the adjustment mechanism 164. It is clear from the foregoing that the greater the allowable travel of free piston 158, the smaller the amount of concentrate expelled into exhaust chamber 20, and vice versa. As shown in FIG. 3, the amount of concentrate thus expelled may be indicated by appropriate index marks 182 located on the exterior of cylinder head 150 of compensating cylinder assembly 14. In the same manner, movement of water cylinder piston 44 from right to left will cause slave piston 52 to move in the same direction, thereby causing free, floating piston 158 to move from left to right, as shown in FIG. 2. As piston 158 is stopped by abutting against the interior end of cylinder head 148, a small amount of concentrate will be expelled through the pressure relief valve 90 into line 94 and exhaust chamber 20. Thus it is apparent that the present invention includes a metering assembly that carefully and continuously expels a predetermined quantity of gravity-fed liquid, or concentrate, into the path of travel of the liquid under pressure, or water.

Figure 6:
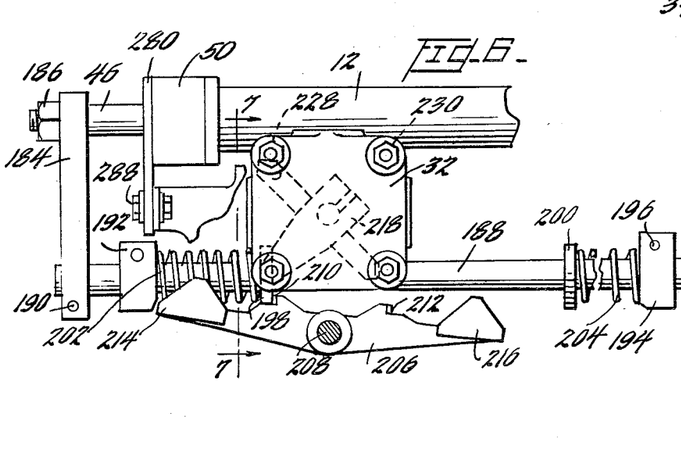
FIG. 6 is a partial, sectional view of the lower left hand portion of FIG. 1.
Figure 7:
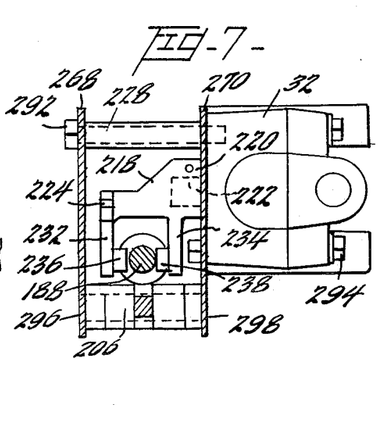
FIG. 7 is a sectional view taken along lines 7—7 of FIG. 6.

Referring now to FIGS. 1, 6, 7, and 8, the construction and operation of the reversing assembly 18, which provides reciprocating action to piston 44 and piston rod 46, will now be explained. Referring to FIG. 6, it is seen that piston rod 46 extends through housing 50. A vertical guide arm 184 is secured to this end of piston rod 46 by convenient means, such as threaded nut 186. A horizontally movable actuating rod 188 is keyed to the lower end of guide arm 184, and is maintained thereby by a set screw 190. Thus actuating rod 188 is caused to move in unison with piston rod 46, parallel therewith. A pair of trip blocks 192, 194, are rigidly attached to rod 188 by set screws 196. A pair of slidable actuator sleeves 198 and 200 are also mounted on rod 188, interiorly of trip blocks 192, 194, and are attached to said blocks by compressible springs 202, 204, respectively. A rocker arm assembly 206 is pivotally mounted on a pin 208, immediately beneath four-way valve 32. Rocker arm assembly 206 includes a pair of vertical faces 210, 212, adapted for selective contact with sleeves 198, 200, respectively, and a pair of trip members 214, 216, adapted for selective contact with trip blocks 192, 194, respectively. A valve actuating arm 218, shown in detail in FIG. 8, is located on the rear of four-way valve 32, adjacent actuating rod 188. A locking screw 220, through the upper, split end of actuator 218, secures the same to central shaft 222 of four-way valve 32. Actuator 218 includes a pair of stop arms 224, 226, adapted to selectively contact stop sleeves 228, 230, respectively. Finally, actuator 218 also includes a pair of depending ears 232, 234, having pins 236, 238, therein. As shown in FIG. 7, pins 236, 238, are located in a horizontal plane extending into actuating rod 188, on either side thereof, and are adapted for intermittent contact with the faces of actuator sleeves 198, 200.

Turning now to FIGS. 1 and 6, the operation of reversing assembly 18 will be readily apparent. FIG. 6 shows piston rod 46 in a position immediately prior to the limit of its movement toward the right. Correspondingly, actuating rod 188 is in a similar position. At the same time, actuator sleeve 198 is in face contact with vertical face 210 of rocker arm 206. Trip block 192 is in a position immediately adjacent trip member 214 of rocker arm 206. As piston rod 46 reaches the limit of its right hand movement, trip block 192 will contact trip member 214, thereby pivoting rocker arm 206 in a counter-clockwise direction. Said counter-clockwise movement will release actuator sleeve 198 from vertical face 210 and, due to the urging of spring 202, which has been compressed by the right hand movement of trip block 192 and the stationary position of sleeve 198, sleeve 198, acting against pins 236, 238, will move to the right, thereby causing valve actuator 218 and shaft 222 to rotate 90°, clockwise. This last movement causes four-way valve 32 to reverse itself. The completed reversal of four-way valve 32 is clearly shown in the lower left hand corner of FIG. 1. In the same manner, valve 32 is reversed again when piston rod 46 reaches the limit of its travel in a left hand direction. In this position, trip block 194 will act upon trip member 216, releasing sleeve 200 from vertical face 212, thereby causing sleeve 200 to reverse four-way valve 32, under the urging of compressed spring 204. Stop arms 224, 226, acting upon stop sleeves 228, 230, prevent over compensation of the reversal movement above described.

Figure 10:
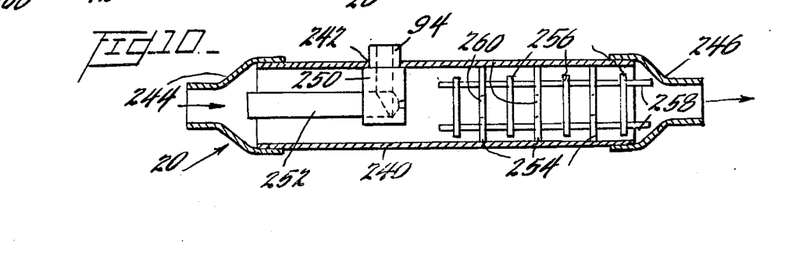
FIG. 10 is a sectional view of the exhaust mechanism, and is taken along lines 10—10 of FIG. 1.

Attention is now directed to FIGS. 1 and 10, and the following discussion of the construction and operation of exhaust chamber 20. The chamber comprises an external jacket 240, of relatively large diameter, having an entry port 242 along one side thereof for concentrate line 94. A pair of reducing couplings 244, 246, are mounted on either end of jacket 240 for connection to water entry line 42 and coolant exhaust coupling 248, respectively. An atomizer unit 250 is secured interiorly of jacket 240, on entry port 242, and includes a water entry tube 252. A series of doughnut and disc baffle plates 254, 256, are mounted within pipe 240 to the right of atomizer head 250, and are joined together by rods 258. The larger doughnut baffle plates, 254, are provided with central bores 260 to permit passage of coolant therethrough. The operation of exhaust chamber 20 is relatively simple. Water under pressure enters the chamber through coupling 244 from inlet pipe 42 and four-way valve 32. Some water is injected through tube 252 and atomizer 250, where it is joined with concentrate entering from line 94. Thorough mixing of the two liquids is assured by the assembly of doughnut and disc baffle plates, the resulting coolant passing through effluent line 248, ready for use.

The supporting structure for the invention is best indicated in FIGS. 1 and 3. Water cylinder 10 comprises an open cylinder sealed by end plates 260 and 262, each having appropriate ports therein for water lines or pipes, 34 and 38, respectively. The two end plates are secured together by a number of tie rods 264 having threaded nuts 266 thereon. A pair of support plates 268 and 270 are connected to end plate 262 by means of ears 272 and 274 having appropriate bores therein for receiving tie rods 264 and nuts 266. Plates 268, 270, extend along either side of slave and compensating cylinders 12 and 14, and are further provided with additional ears 276, 278, at the ends thereof, respectively. As shown in FIG. 5, and FIG. 3, housing 50 is provided with an inverted T and plate 280, secured thereto by a series of bolts 282. The head of the T is formed as a pair of extending ears 284 and 286 whihc mate with ears 276 and 278 respectively, and are secured thereto by nut and bolt assemblies 288. Referring to FIGS. 4 and 7, four-way valve 32 is attached to the support plates, adjacent central bore 290, in support plate 270, by nut and bolt assemblies 292, which extend through stop sleeves 228 and 230, and by a shorter pair of nut and bolt assemblies 294, which secure valve 32 to support plate 270 only. Support plates 268 and 270 extend beneath four-way valve 32, and are provided with aligned bores 296, 298, for receiving pin 208 of rocker arm 206. Support plates 268 and 270 are further provided with longitudinally extending portions 300 and 302, as indicated in FIGS. 1 and 4, which are located beneath water cylinder 10, parallel with actuating rod 188. A sleeve guide 304 is secured between these portions by nuts 306 so as to support actuating rod 188 sliding therein.

Turning now to FIG. 11 in particular, the operation of the entire invention will be discussed. The figure indicates the entry of water and concentrate into the system, and the expulsion of coolant therefrom. As the position of four-way valve 32 indicates, water under pressure enters through line 30 to line 34 and cavity 36 of water cylinder 10, thereby moving piston head 44 in a left hand direction. The slave and compensating cylinder assemblies 12 and 14 operate to inject a small amount of concentrate into exhaust chamber 20 through line 94 as previously discussed. As piston head 44 nears the limit of its left hand movement, reversing mechanism 18, shown in FIG. 6, and described above, operates to reverse four-way valve 32 in a counterclockwise movement. This movement will allow water under pressure to pass from entry pipe 30 to pipe 38 and cavity 40 of water cylinder 10, thereby moving piston head 44 in a right hand direction. At the same time, the residual water in cavity 36 will pass through line 34 to four-way valve 32, and thence to line 42 and exhaust chamber 20. Simultaneously, another small amount of concentrate will be expelled by slave and cylinder assemblies 12 and 14 into line 94 and exhaust chamber 20. As piston head 44 nears the limit of its right hand movement, reversing assembly 18 acts again to reverse four-way valve 32 in a clockwise direction, and thus the cycle repeats itself continuously. Of course, a lack of either water or concentrate will shut off the invention, through the action of quick-open valve 24 or the safety shut-off assembly 16.

In the preferred form of the invention as shown and described above, a single supply of concentrate enters the system under force of gravity and is mixed with a second liquid supplied under pressure. The operation of the primary piston in cylinder 10 creates a vacuum within slave cylinder assembly 12 thereby drawing the concentrate into the system. Supplying the concentrate under force of gravity assists the operation of the invention, but the concentrate may be supplied without such assistance, without rendering the invention inoperable.

Secondly, the invention as disclosed above merely provides a system for mixing and metering two liquids. It is obviously within the scope of the invention to mix additional liquids with the liquid supplied under pressure.

I claim:

1. A system for metering one liquid into the flow of another flowing liquid, comprising a first cylinder having a movable piston, a second cylinder having a second movable piston, a piston rod common to said first and second pistons, a third cylinder having a free piston, both ends of said third cylinder operatively communicating with said second cylinder, first piping means communicating said flowing liquid to each end of said first cylinder, additional piping communicating said one liquid to each end of said second cylinder, sealing means about said piston rod at its entrance into said first and second cylinders, means connected with said third cylinder for adjusting the limit of travel of said free piston, comprising a movable sleeve mounted around and communicating with the interior of said third cylinder, a first stop means secured interiorally of said sleeve on one side of said free piston, second stop means secured interiorally of the third cylinder, positioned axially on the other side of said free piston, and adjusting means engaged with said first stop means, for moving said first stop means and said sleeve along the axis of said third cylinder, for varying the volumetric capacity thereof, a reversing valve secured to said first piping means for alternating the path of travel of said flowing liquid to said opposite ends of the first cylinder and for alternating discharge of the liquid from the first cylinder, actuating means for said reversing valve secured to said piston rod, a safety shut-off means located in said first piping means, a line from said additional piping conveying liquid to said safety shut-off means, said safety shut-off means operative upon depletion of said one liquid therefrom, an exhaust chamber for admitting and mixing said liquids and being secured to said reversing valve, and second line means from both ends of said second cylinder to said exhaust chamber, the movement of said free piston adapted to responsively absorb a portion of the volumetric displacement in said second cylinder by said second piston, the remaining portion of said volumetric displacement being discharged to said exhaust chamber.

2. The device of claim 1 wherein said actuating means comprises an operating rod located beneath said reversing valve and movable in correspondence responsively with said piston rod, an arm connecting said piston rod and said operating rod, a rocker arm having a pair of upstanding portions on either side of the axis thereof and mounted beneath said operating rod, an actuator arm for said reversing valve secured over said operating rod, a pair of trip blocks fixed to said operating rod at either end thereof, and a pair of spring and collar means secured one to each of said blocks and directed inwardly towards the reversing valve, so that upon approach of one of said blocks to the reversing valve, the collar thereon will abut against one of said upstanding portions of said rocker arm for compressing said spring, and the trip block being released from the collar deflects said rocker arm, thereby causing said collar to strike the actuator arm under urging of said compressed spring, and thereby reverse the state of said valve.

3. The device of claim 1 wherein said adjusting means comprises an externally adjustable screw, threadably engaged to said first stop means.

4. The device of claim 1 wherein said safety shut-off means comprises a valve having an external plunger, said valve adapted to being opened by depressing said plunger, a bracket secured adjacent said plunger, an operating handle pivotally mounted on said bracket for depressing said plunger, a pair of laterally movable release arms interposed between said handle and bracket and having slots therein for guiding pivotal movement of said handle, means on said handle cooperating with said slots retaining said handle in a position depressing said plunger, and a bellows secured to one end of said release arms and operatively connected to the inlet portion of said additional piping so that upon depletion of said one liquid, said bellows thereby contracts for moving said release arms to allow the handle to pivot upwardly in said slots under urging of said plunger for closing said valve.

5. The device of claim 1 wherein said exhaust chamber comprises an enlarged tube having an opening at one end for admission of said flowing liquid and an exhaust means for expulsion of mixed liquid, an atomizer assembly mounted centrally of said exhaust chamber for admission of said one liquid, and a series of baffle plates of varying diameters secured between said atomizer assembly and said exhaust means for mixing said liquids.

6. A system for metering one liquid into the flow of another liquid comprising a first and second cylinder each having a piston therein, a piston rod, common to each of said pistons and extending through at least one of the cylinders, a third cylinder operatively communicating with said second cylinder and having a free piston therein, means limiting the movement of said free piston, first piping communicating the flowing liquid to each end of said first cylinder, a four-way valve for alternating said flow and for admitting and discharging said flowing liquid, second piping communicating said one liquid to each of the the ends of the second cylinder, the volume of said third cylinder adapted to absorb a portion of the volume of said second cylinder and discharge the remainder into said second piping, reversing means operative from the free end of said piston rod through said four-way valve for selectively reciprocating the pistons of said first and second cylinders, and a safety shut-off means adjacent the entry portion of said four-way valve for shutting off said flowing liquid and operable upon depletion of said one liquid, said safety shut-off means comprising a valve having an external plunger, said valve being opened upon depressing said plunger, a bracket secured adjacent said plunger, a pivoting handle located on said bracket and adapted to so depress said plunger, a release arm assembly having slots therein, means on said handle coacting with said slots to control the movement thereof, and a bellows on said bracket being mounted proximate said handle and operatively secured to said arm assembly and to said second piping, so that upon depletion of said one liquid therefrom, said bellows is caused to contract for moving said arm assembly, thereby permitting said handle to be deflected by said plunger for closing said valve.

7. In a system for metering one liquid into the flow of another liquid, including a first cylinder with a reciprocating piston driven by the flowing liquid, and a second cylinder having a second piston being slave-driven by the action of the first piston, mixing means for the liquids, first piping communicating the flowing liquid to each end of the first cylinder, and from said ends of the first cylinder to the mixing means for the liquids, and second piping communicating said one liquid to each of the ends of the second cylinder, and from the said ends of the second cylinder to said mixing means for the liquids, said second piston being slave-driven to intermittently discharge a quantity of said one liquid into said second piping and said mixing means, means for controlling said discharge comprising a third cylinder having a free piston therein communicating with said second cylinder and adapted to absorb a portion of the volume of said second cylinder and being further adapted to discharge the remainder into said flowing liquid, and externally operable stop means within said third cylinder for adjusting the limit of travel of said free piston for regulating the portions of said volume absorbed and expelled, respectively, comprising means defining a pair of chambers, one secured to each end of said second cylinder, and said externally operable stop means comprises a sliding tube, mounted on the free ends of said chambers, said free piston movable in said tube, a first stop means attached interiorly of said tube, and an externally operable set screw threadedly engaging said first stop means, one of said free ends opposite said first stop means forming a second stop means for said free piston.

8. The device of claim 7 wherein said set screw is housed in one of said chambers, said one chamber including external indices positioned adjacent said tube for indicating the volumetric relationship of said one liquid being discharged to said flowing liquid, and dog means associated with said tube for preventing rotation of said tube about its central axis.

9. A system for metering one liquid into the flow of another liquid, including a first cylinder with a reciprocating piston driven by the flowing liquid, and a second cylinder having a second piston being slave-driven by the action of the first piston, mixing means for the liquids, first piping communicating the flowing liquid to each end of of the first cylinder, and from said ends of the first cylinder to the mixing means for the liquids, and second piping communicating said one liquid to each of the ends of the second cylinder, and from the said ends of the second cylinder to said mixing means for the liquids, said second piston being slave-driven to intermittently discharge a quantity of said one liquid into said second piping and said mixing means, and a safety shut-off means for interrupting the flowing liquid for stopping the action of the receiprocating piston, operable by depletion in the supply of said one liquid, comprising a valve, having an external plunger normally urged upward to a closed valve position, said valve opened by depressing said plunger, a bracket secured adjacent to said plunger, a pivoting handle on said bracket adapted to depress said plunger, a release arm assembly mounted on said bracket adjacent said handle and adapted to depress said handle against said plunger, cooperative means retaining said handle in said release arm assembly, and a bellows attached to said release arm assembly contractable upon depletion of said one liquid for moving said release arm assembly to release said handle from said plunger and close said valve.

10. The device of claim 9 wherein said release arm assembly comprises a pair of channeled plates, one to each side of said handle, each said plate having a first pair of channels for sliding attachment to said bracket, said cooperative means including a second arcuate channel for cooperation with the end of said handle disposed opposite its pivoting axis for limiting movement of said handle.

11. The device of claim 9 wherein said bellows is adapted to expand under urging of a supply of said one liquid, thus permitting said handle to be depressed against said plunger to open said valve.

12. In a ratio controlled metering of liquids system, a cylinder having a free piston, said cylinder including adjustment means to limit the travel of the free piston, said adjustment means including a movable sleeve forming a portion of the cylinder, a first stop means fixed in said sleeve for limiting in one direction the displacement of said free piston, a second stop means for limiting in the opposite direction the displacement of said free piston in said opposite direction, and a means engaging said first stop means for moving and setting said first stop means and the sleeve, along the axis of said cylinder for adjusting the volumetric capacity of said cylinder.

13. In a ratio controlled metering system, a first cylinder having oppositely disposed end chambers secured respectively to and communicating with each end of a second cylinder, means being integral with said first cylinder including a tube over the free ends of said end chambers, a free piston being movable in said tube, one of said free ends forming a stop means for the free piston, a second stop means being secured in said tube and axially disposed on an opposite side of the free piston from said other stop means, and an externally operable axially disposed screw for said second stop means being operable to move the second stop means and the tube along an axis of said tube, said free piston movable by fluid passing into said tube from the second cylinder.

14. In a ratio controlled metering system for two or more liquids, a safety shut-off means comprising a valve having an external plunger, said valve being opened upon depression of said plunger, said plunger normally urged upwardly to a closed valve position, a bracket secured adjacent said plunger, a pivotal handle located on said bracket and adapted to depress said plunger, a release arm assembly having slots thereon coacting with said handle to control the movement thereof, means on said handle cooperating with said slots for controlled movement of said handle, and a bellows on said bracket, connected to said system, being mounted adjacent said handle, and operatively secured to said arm assembly so that upon depletion of one of said liquids from said system, said bellows is caused to contract for moving said arm assembly thereby permitting said handle to be deflected by said plunger for closing said valve.

15. In a ratio controlled metering system for two or more liquids, a safety shut-off means including a valve having an external plunger, said plunger normally urged upwardly to a closed valve position, said valve adapted to being opened upon depression of said plunger, a bracket secured adjacent said plunger, an operating handle pivotally mounted on said bracket for depressing said plunger, a pair of laterally movable release arms interposed between said handle and said bracket and having slots therein for guiding pivotal movement of said handle, means on said handle cooperating with said slots, a bellows connected to said system and secured to one end of said release arms so that upon any depletion of one of said liquids from said system, said bellows contracts for moving the release arms to allow the handle and handle cooperative means to pivot along said slots upon urging of said plunger for closing said valve.

References Cited

UNITED STATES PATENTS

| | | | |
|---|---|---|---|
| 1,931,818 | 10/1933 | Hartman | 137—99 |
| 2,203,832 | 6/1940 | Malburg | 137—99 |
| 2,371,704 | 3/1945 | Nichols | 103—48 X |
| 2,413,029 | 12/1946 | McFarland | 137—99 X |
| 2,672,366 | 3/1954 | Deport | 239—310 |
| 2,673,707 | 3/1954 | McRae | 251—73 |
| 2,675,358 | 4/1954 | Fenley | 239—310 X |
| 2,833,307 | 5/1958 | Henderson | 137—556 |
| 2,842,151 | 7/1958 | Cunningham et al. | 251—73 X |
| 2,887,094 | 5/1959 | Krukemeier | 137—98 X |
| 3,213,873 | 10/1965 | Cordis | 137—99 |

FOREIGN PATENTS 649,069    1/1951    Great Britain.

WILLIAM F. O'DEA, Primary Examiner

D. J. ZOBKIW, Assistant Examiner

U.S. Cl. X.R.

103—6, 37; 251—73, 94